April 3, 1956  R. K. DIX  2,740,636
ANIMAL FIGURE AND SOUND-SIMULATING VELOCIPEDE
Filed Nov. 10, 1952

RICHARD K. DIX
INVENTOR

HUEBNER, BEEHLER,
WORREL & HERZIG
ATTORNEYS

United States Patent Office 2,740,636
Patented Apr. 3, 1956

2,740,636

ANIMAL FIGURE AND SOUND-SIMULATING VELOCIPEDE

Richard K. Dix, Fresno, Calif., assignor to Robert E. Dix, Fresno County, Calif.

Application November 10, 1952, Serial No. 319,627

6 Claims. (Cl. 280—1.14)

The present invention relates to riding toys and more particularly to a riding toy simulating the appearance of an animal, such as a horse, having provision for the auditory imitation of the characteristic sounds of the animal simulated, such as neighing, baying, barking or the like.

It has long been recognized that toys of simulated animal form have special child appeal. It has also been known to imitate animals having characteristics suited to particular toy forms. Thus velocipedes and various riding toys have appeared as horses and other riding animals. The imitation of animals in such toys, however, has generally been limited to the adoption of animal form bodies mounted on wheels. Such bodies make little or no provision for animal-like movement or sound production and no correlation of characteristic movement and sound production.

An object of the present invention is to provide a riding toy of simulated animal form adapted to create an improved illusion of a live animal.

Another object is to provide more realistic animal simulation in toys.

Another object is to provide an animal-like toy adapted to have movements imparted thereto characteristic of a live animal and having provision for the emission of animal-like sounds normally associated with such movements.

Another object is to provide a velocipede having the appearance of a horse or pony and having a steerable neck and head in which the head may be bobbed or nodded in a life-like manner.

Another object is to provide such a toy having provision for the emission of neighing sounds in response to such head movement.

Further objects are to provide improved elements and arrangements thereof in a device of the character and for the purposes set forth that is economical to produce, durable in structure and fully effective in accomplishing its intended functions.

Still further objects and advantages will become apparent in the subsequent description in the specification.

Figure 1:
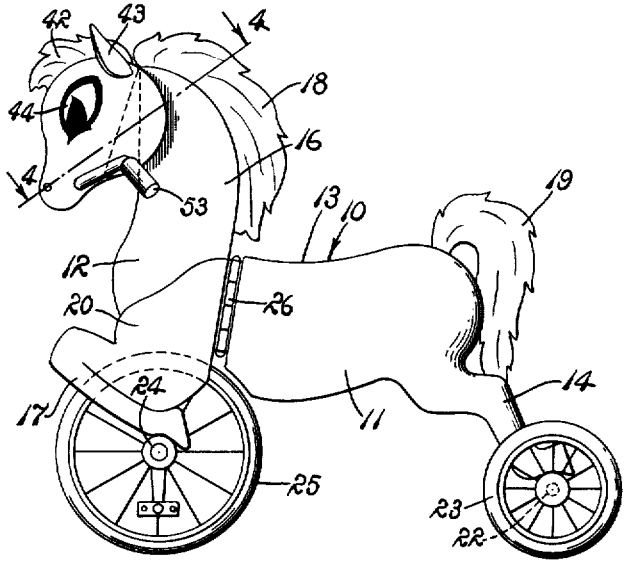
Fig. 1 is a side elevation of a riding toy embodying the principles of the present invention.

Referring in greater detail to the drawing:

The riding toy of the present invention is illustrated as a velocipede or tricycle of horse or pony form having a body portion 10 divided into a rearward segment 11 and a forward segment 12. The rearward segment provides a seat portion 13 and has a pair of rearwardly and downwardly extended spaced legs 14.

The forward segment 12 of the body portion 10 provides an upwardly extended neck 16 and upwardly folded forward legs 17 imitative of the forward legs of a galloping horse. The upper end of the neck provides a substantially straight forwardly disposed edge. The legs are preferably in adjacent spaced relation defining a space therebetween for purposes soon to become apparent.

The body portion is formed of any suitable material by any desired method. It has been found convenient, for example, to cast the rearward segment 11 of aluminum, plastic, or the like or to carve the same from wood. The forward segment 12 may be similarly formed but conveniently is of plywood or other relatively flat durable material. The described spacing of the forward legs 17 is best attained by forming the neck 16 of a single panel of plywood or the like and forming shoulder portions 20 on each of the legs 17. Each leg and its shoulder portion is conveniently cut from a single panel of plywood or the like and the panels mounted on opposite sides of the neck, as shown. In simulation of the animal form, the neck 16 is provided with a mane 18 and the rearward segment with a plumed tail 19.

An axle 22 is mounted in the downwardly and rearwardly extended legs 14 and support wheels 33 journalled on opposite ends thereof. Bearings 24 are provided in the lower ends of the forward legs 17 and a pedal wheel 25 rotatably mounted therein with the wheel disposed between the legs. A hinge 26 interconnects the segments 11 and 12 for relative horizontal pivotal movement so that an operator supported on the seat 13 may pedal the wheel 25 and by pivotally directing the forward segment 12 direct the velocipede in the manner well known in tricycles.

An inverted V-shaped leaf spring 28 is provided having a rearward arm 29 and a forward arm 30. Each of the arms have bracket plates 31 extended therefrom transversely in substantially right angular relation thereto. The rearward arm is mounted against the forward edge of the neck 16 by means of screws or bolts 32 extended through the bracket plate 31 thereof and into the neck. So positioned, the forward arm 30 is downwardly and forwardly extended therefrom. It will be noted that each of the arms has a port 33 formed therethrough.

A substantially flat central head member 35 is mounted on the forward arm 30 of the spring 28, as by screws or bolts 36 extended through the forward bracket plate 31 and into the central head member. In silhouette, the central head member has a periphery shaped generally to designate the head and nose of a pony and a substantially straight rearward edge fitted against the arm 30. The central head member also provides a pocket 37 therein in registry with the port 33 in the forward arm 30. For purposes of lightening the structure, said member may also have one or more cavities 38 therein.

A pair of opposite side head members 40 are mounted on opposite sides of the central head member in overlaying relation to the pocket 37 and cavity 38 and are rearwardly extended in shielding relation to the spring 28 and slideably overlap the neck 16. The side head members have head edges and nose edges fitted to the corresponding portions of the central head member and each provides a nostril opening 41 therethrough in communication with the pocket 37. The rearwardly extended edges of the side head members 40 are preferably arcuate in form and generally simulate the jaw portion of a horse's head. The head members 35 and 40 are conveniently formed of plywood panels or the like and the central head member 35 provided with a tufted mane 42 and the side head members 40 with ears 43 of fabric or the like. An eye 44 is painted or otherwise defined on each of the side head members. For purposes of further simulating the appearance of a horse or the like the exposed surfaces of the body portion 10, including the segments 11 and 12 and the head members 35 and 40 are coated with flock.

A bellows 46 is mounted between the arms 29 and 30 of the spring 28 in communication with the ports 33. The bellows may be of any suitable form, collapsible upon movement of the arms towards each other and expandable upon increasing the spaced relation of the arms. A check valve 47 is mounted on the arm 29 in covering relation to the port 33 therein and serves to limit air passage through the port to a direction passing into the bellows. An air supply duct 48 is formed in the neck so that upon increased spacing of the arms the bellows is expanded and air drawn through the duct thereto.

A bracket 50 is mounted in the pocket 37 of the central head member intermediate the nostril openings 41 and the spring 28. A reed 51 or other air operable sound producing member is mounted on the bracket. It will be apparent that when the arm 30 is moved toward the arm 29, air is forced from the bellows 46 through the port 33 in the arm 30 and strikes the reed in its movement out of the nostril openings 41. The reed or other air operated sound member is selected to produce a desired sound. For example, in a velocipede of the character shown, the reed preferably is productive of a neighing sound.

To aid in the guiding of the velocipede and in the bobbing or nodding of the head members 35 and 40 on the spring 28, rein bars 53 are laterally extended from the head.

Operation

The operation and utility of the riding toy of the present invention are believed to be clearly apparent and are briefly summarized at this point. A child in using the toy, straddles the body portion 10 in a seated position on the portion 13 and grasps the rein bars 53. By pedalling the wheel 25 in the usual manner, the toy is motivated as desired. It will be noted that the leaf spring 28 tends to resist twisting action so that guiding of the rein bars 53 pivotally positions the forward segment 12, much in the manner that a tricycle is guided.

Figure 2:
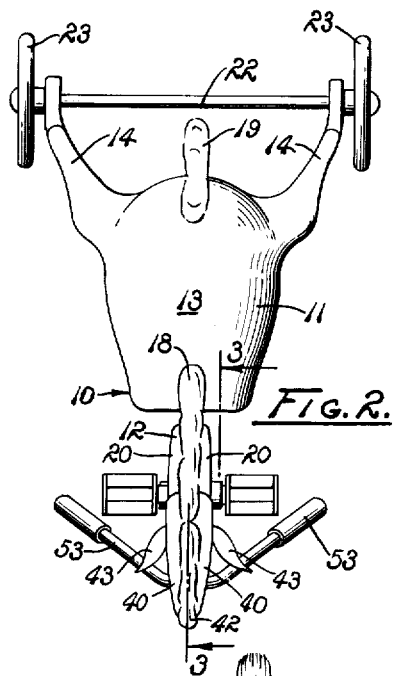
Fig. 2 is a plan view of the riding toy shown in Fig. 1.
Figure 3:
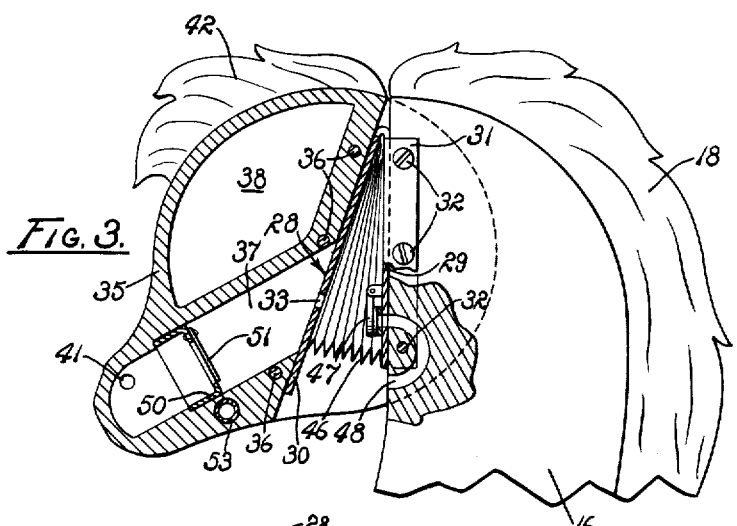
Fig. 3 is a somewhat enlarged fragmentary vertical section through the toy taken on line 3—3 of Fig. 2.
Figure 4:
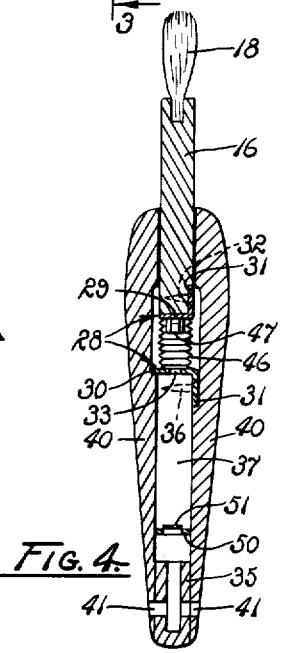
Fig. 4 is a section taken on line 4—4 of Fig. 1.
Figure 5:
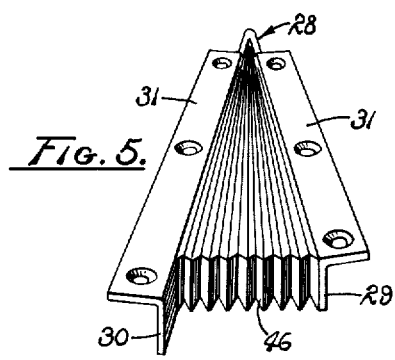
Fig. 5 is a perspective view of a combined V-shape leaf spring and bellows utilized in the subject invention to attach a head portion of the toy to a neck portion thereof.

By drawing rearwardly on the rein bars 53, the head members 35 and 40 are caused to pivot downwardly and rearwardly on the spring 28. Successive rearward pulling on the rein bars imparts a realistic nodding or bobbing to the head similar to the action of a horse's head in galloping. Each rearward pull on the rein bars sufficient to compress the spring 28 compresses the bellows 46 closing the check valve 47 and expelling air onto the reed 51 to cause the desired sound to be emitted. When the rein bars are released, the spring 28 returns the head to the position shown in Figs. 1 and 2 and air is drawn into the bellows through the ports 33.

The riding toy described is simple in structure and possesses the advantage of characteristic animal-like movements automatically accompanied by sounds selected to increase the illusion of a live animal. Shielded by the side head members 40, the bellows 46 is protected from damage. The overlaying of the neck 16 by the side members 40 also minimizes the possibility of a child being pinched between the relatively moving parts. Housed in the pocket 37, the reed 51 is protected.

Although I have herein shown and described my invention in which I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and apparatus.

Having described my invention, what I claim as new and desire to secure by Letters Patent is:

1. In a riding toy having a body of simulated animal form providing an upwardly extended substantially transversely flat neck having a forwardly disposed edge, an inverted V-shape leaf spring having a rearward arm mounted on the forwardly disposed edge of the neck and a downwardly and forwardly extended arm, each of the arms having a port therethrough, a substantially flat central head member having a rearward edge mounted on the forward arm of the spring providing a pocket in register with the port in said arm, a pair of side head members mounted on opposite sides of the central head member in overlaying relation to the pocket and extended on opposite sides of the spring in slidable overlaying relation to the neck, the side head members having nostril openings in communication with the pocket of the central head member, a reed mounted in the pocket between the nostril openings and the spring, a bellows mounted between the arms of the spring in communication with the ports in the arms, and a check valve mounted on the rearward arm of the spring in closing relation to the port therein limiting air movement through said port to a direction inwardly of the bellows.

2. A velocipede comprising a body simulating a horse having a forward segment and a rearward segment, the rearward segment having a pair of rearwardly and downwardly extended legs and the forward segment having an upwardly extended neck providing a forwardly disposed edge, hinge means pivotally interconnecting the segments of the body, a pair of axially spaced wheels mounted on the rearwardly extended legs of the rearward segment, a pedal wheel mounted on the forward segment, an inverted V-shape leaf spring having a rearward arm mounted on the forward edge of the neck and a forwardly and downwardly extended arm, a central head member mounted on the forward arm of the leaf spring, opposite side head members mounted on opposite sides of the central head member and rearwardly extended therefrom on opposite sides of the leaf spring in slidable overlaying relation to the neck, a bellows mounted between the arms of the leaf spring for compression between the arms of the leaf spring, an air operated sounding means operatively connected to the bellows, and rein bars transversely extended from the head members.

3. In a riding toy of simulated animal form having a forward segment and a rearward segment, ground engaging wheel means mounted on each of the forward and rearward segments, the forward segment having an extended neck providing a forwardly disposed edge, hinge means pivotally interconnecting the segments of the body to permit relative turning movement therebetween, an inverted V-shape leaf spring having a rearward arm mounted on the forward edge of the neck and a forwardly and downwardly extended arm, a central head member mounted on the forward arm of the leaf spring, opposite side head members mounted on opposite sides of the central head member and rearwardly extended therefrom on opposite sides of the leaf spring in slidable overlaying relation to the neck, a bellows mounted between the arms of the leaf spring for compression between the arms of the leaf spring, an air operated sounding means operatively connected to the bellows and common control means connected to the opposite side head members for compressing the bellows and for controlling the angular position of the forward segment relative to the rearward segment.

4. In a toy having a body of simulated animal form providing a neck, a head mounted on the neck for relative movement toward and from the neck having a pocket interiorly thereof and having nostril openings communicating with the pocket, means yieldably urging the head outwardly from the neck, a bellows provided with an air inlet means and an air outlet means and being mounted between the head and neck for compression therebetween upon movement of the head toward the neck, the air outlet means of the bellows communicating with the pocket in the head, and a sounding means mounted in the pocket intermediate the nostril openings and the air outlet means of the bellows and adapted for actuation upon compression of the bellows.

5. In a riding toy having a body of simulated animal form providing an upwardly extended neck having a forwardly disposed edge, a V-shape leaf spring having a rearward arm mounted on the forwardly disposed edge of the neck and a forwardly extended arm normally angularly positioned relative to the rearward arm, each of the arms having a port therethrough, a central head member having a rearward edge mounted on the forward arm of the spring and providing a pocket in registry with the port in the forward arm, a pair of side head members mounted on opposite sides of the central head member in overlying relation to the pocket and extended on opposite sides of the spring in slidable overlaying relation to the neck, the side head members having nostril openings in communication with the pocket of the central head member, a reed mounted in the pocket between the nostril openings and the spring, a bellows mounted between the arms of the spring in communication with the ports in the arms, and a check valve mounted on the rearward arm of the spring in closing relation to the port therein limiting air movement through said port to a direction inwardly of the bellows.

6. A velocipede comprising a body simulating a horse having a forward segment and a rearward segment, the rearward segment having a pair of rearwardly and downwardly extended legs and the forward segment having an extended neck providing a forwardly disposed edge, hinge means pivotally interconnecting the segments of the body, a pair of axially spaced wheels mounted on the rearwardly extended legs of the rearward segment, a wheel mounted on the forward segment, a V-shape leaf spring having a rearward arm mounted on the forward edge of the neck and a forwardly extended arm normally angularly related to the rearward arm, a central head member mounted on the forward arm of the leaf spring, opposite side head members mounted on opposite sides of the central head member and rearwardly extended therefrom on opposite sides of the leaf spring in slidable overlaying relation to the neck, a bellows mounted between the arms of the leaf spring for compression between the arms of the leaf spring, an air operated sounding means operatively connected to the bellows, and rein means connected to the head members.

References Cited in the file of this patent

UNITED STATES PATENTS

| 953,289 | Pressler | Mar. 29, 1910 |
| 1,447,953 | Herschmann | Mar. 6, 1923 |
| 1,808,887 | Dunkley | June 9, 1931 |
| 1,829,680 | Schelle et al. | Oct. 27, 1931 |
| 1,871,592 | Doody | Aug. 16, 1932 |
| 2,586,938 | Gowland | Feb. 26, 1952 |

FOREIGN PATENTS

| 24,391 | Great Britain | Oct. 17, 1896 |
| 235,028 | Great Britain | June 11, 1925 |
| 442,497 | Germany | Apr. 2, 1927 |
| 848,084 | France | July 17, 1939 |